United States Patent
Akopian et al.

(10) Patent No.: US 6,894,645 B1
(45) Date of Patent: May 17, 2005

(54) POSITION ESTIMATION (75) Inventors: David Akopian, Tampere (FI); Harri Valio, Kämmenniemi (FI); Jari Syrjärinne, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/734,080

(22) Filed: Dec. 11, 2003

(51) Int. Cl.[7] .............................. G01S 3/02; G01S 1/08; H04B 7/185
(52) U.S. Cl. ............. 342/464; 342/357.02; 342/357.06; 342/357.12; 342/386; 342/463
(58) Field of Search ............................ 342/386, 357.12, 342/357.02, 357.06, 463–464

(56) References Cited

U.S. PATENT DOCUMENTS

| | | | | |
|---|---|---|---|---|
| 6,243,648 B1 | * | 6/2001 | Kilfeather et al. | 701/213 |
| 6,728,545 B1 | * | 4/2004 | Belcea | 342/357.06 |
| 2002/0072853 A1 | * | 6/2002 | Sullivan | 342/357.07 |

OTHER PUBLICATIONS

Web pages: www.colorado.edu/geography/gcraft/notes/gps/gps.html, "Global Positioning System Overview," by Peter H. Dana, 1994, copyright 1999, 12 pp.
"Computation of the Discrete Fourier Transform," Chapter 9, pp. 581–622.

* cited by examiner

Primary Examiner—Thomas H. Tarcza
Assistant Examiner—F H Mull (57) ABSTRACT

The invention relates to a method for estimating the position of a receiver receiving code modulated signals from at least one beacon. The method comprises delimiting a region containing the receiver position based on a code modulated signal received at the receiver from at least one beacon and on available information including at least an initial information on the receiver position. The method further comprises estimating the receiver position as a position within the delimited region which minimizes an error criterion. The invention relates equally to such a receiver, to a system comprising such a receiver and to a corresponding software program product enabling an estimation of the position of a receiver.

12 Claims, 8 Drawing Sheets

POSITION ESTIMATION

FIELD OF THE INVENTION

The invention relates to a method for estimating the position of a receiver receiving code modulated signals from at least one beacon. The invention relates equally to such a receiver, to a system comprising such a receiver and to a software program product in which a software code for estimating the position of a receiver receiving code modulated signals from at least one beacon is stored.

BACKGROUND OF THE INVENTION

It is known in the state of the art to determine the position of a receiver based on code modulated signals from several beacons using, for example, a CDMA (Code Division Multiple Access) spread spectrum communication.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites, which are also called space vehicles (SV), transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s.

The navigation information, which constitutes a data sequence, comprises in particular ephemeris data. The ephemeris data comprises ephemeris parameters describing short sections of the orbit of the respective satellite. Based on these ephemeris parameters, an algorithm can estimate the position of the satellite for any time while the satellite is in the respectively described section. The ephemeris data also comprises clock correction parameters which indicate the current deviation of the satellite clock versus a general GPS time. Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. The receiver first determines the time of transmission TOT of the code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits.

Based on the time of transmission and the measured time of arrival TOA of the signal at the receiver, the time of flight TOF required by the signal to propagate from the satellite to the receiver is determined. By multiplying this TOF with the speed of light, it is converted to the distance between the receiver and the respective satellite. The computed distance between a specific satellite and a receiver is called pseudorange, because the GPS system time is not accurately known in the receiver. Usually, the receiver calculates the accurate time of arrival of a signal based on some initial estimate, and the more accurate the initial time estimate is, the more efficient are position and accurate time calculations. A reference GPS time can, but does not have to be provided to the receiver by a network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from four different GPS satellite signals are required.

In urban and indoor environments, however, the number of found satellites may be less than four. Thus, it is a challenging task to estimate the position of a receiver based on incomplete information.

It is known to use hybrid positioning systems, in which base stations and satellites are used in the positioning, but also such hybrid positioning systems require a certain amount of measurements. If there are not sufficient measurements available, the measurements are discarded and new measurements are obtained.

The problem of missing measurements has been solved by freezing some of the coordinates of the receiver using appropriate reference coordinates and by finding the solution of the usual equations only for the remaining coordinates. An information on the altitude is used in this approach when available. Such a freezing of coordinates may lead to large errors in certain situations, though.

It is to be understood that the problem arises not only for GPS receivers, but as well with any other type of ranging receivers for which the position is to be calculated based on code modulated beacon signals.

SUMMARY OF THE INVENTION

It is an object of the invention to determine the position of a receiver in situations in which the number of available beacons is less than the minimum required by conventional methods.

A method for estimating the position of a receiver receiving code modulated signals from at least one beacon is proposed. The proposed method comprises delimiting a region containing the receiver position based on a code modulated signal received at the receiver from at least one beacon and on available information including at least an initial information on the receiver position. The proposed method further comprises estimating the receiver position as a position within the delimited region which minimizes an error criterion.

Moreover, a receiver is proposed, which comprises for an estimation of its position a receiving portion for receiving a code modulated signal from beacons. The proposed receiver further comprises a processing portion for delimiting a region containing said receiver position based on a code modulated signal received by the receiving portion from at least one beacon and on available information including at least an initial information on the receiver position. The processing portion is adapted in addition for estimating the receiver position as a position within the delimited region which minimizes an error criterion.

Moreover, a system for estimating the position of a receiver receiving code modulated signals from at least one beacon is proposed. The system comprises this receiver, which includes a receiving portion for receiving code modulated signals from a beacon, and a device with a processing portion. The processing portion is adapted for delimiting a region containing the receiver position based on a code modulated signal received by the receiving portion from at least one beacon and on available information including at least an initial information on the receiver position, and for estimating the receiver position as a position within the delimited region which minimizes an error criterion.

The proposed system can be realized in several ways, some of which are presented by way of example. The device of the proposed system may include the receiver or be connected to the receiver, the combination of the device and the receiver forming the proposed system. In both cases, the device can be for example a mobile terminal which is able to communicate with a mobile communication network for receiving information supporting the delimitation of the region of possible receiver positions. A network element of the network may then be as well a part of the proposed system. Alternatively, the device of the proposed system can be itself a network element of a mobile communication network. If the receiver is then included in or connected to a mobile terminal, the information on received code modulated signals can be transmitted by the communication functionality of the mobile terminal to the mobile communication network for evaluation by the network element.

Finally, a software program product is proposed, in which a software code for estimating the position of a receiver receiving code modulated signals from at least one beacon is stored. When running in a processing unit, the software code delimits a region containing the receiver position based on a code modulated signal received at the receiver from at least one beacon and on available information including at least an initial information on the receiver position. Further, the software code estimates the receiver position as a position within the delimited region which minimizes an error criterion.

The invention proceeds from the consideration that the respectively available measurements on beacon signals can be made use of independently of the amount of the measurements, when initial information on the position of the receiver and possibly some other information is used for limiting the region in which the receiver may be located and when a final position estimate is selected from this region by minimizing an error according to a certain criterion. The resulting position may not be exactly correct, but the position can be determined immediately and its possible deviation from the true position is as small as possible.

It is an advantage of the invention that it allows to exploit the available information optimally. It allows in particular to estimate a reliable position of a receiver even if the number of available beacons is less than the minimum number required in conventional methods.

Initial information on the receiver position is available in many cases in form of a reference position. A reference position may be the position of a nearby base station of a mobile communication network or of another beacon. It may also be estimated from previous position fixes of the receiver.

The error criterion which is minimized may be for example the maximum possible error, the mean absolute error or the mean square error which results at a respectively selected position.

The invention can be implemented in particular, though not exclusively, in software.

The invention can be employed for the positioning of any type of ranging receiver receiving code modulated signals from any type of beacons, for instance for a receiver of a positioning system like GPS or Galileo receiving code modulated signals from satellites.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
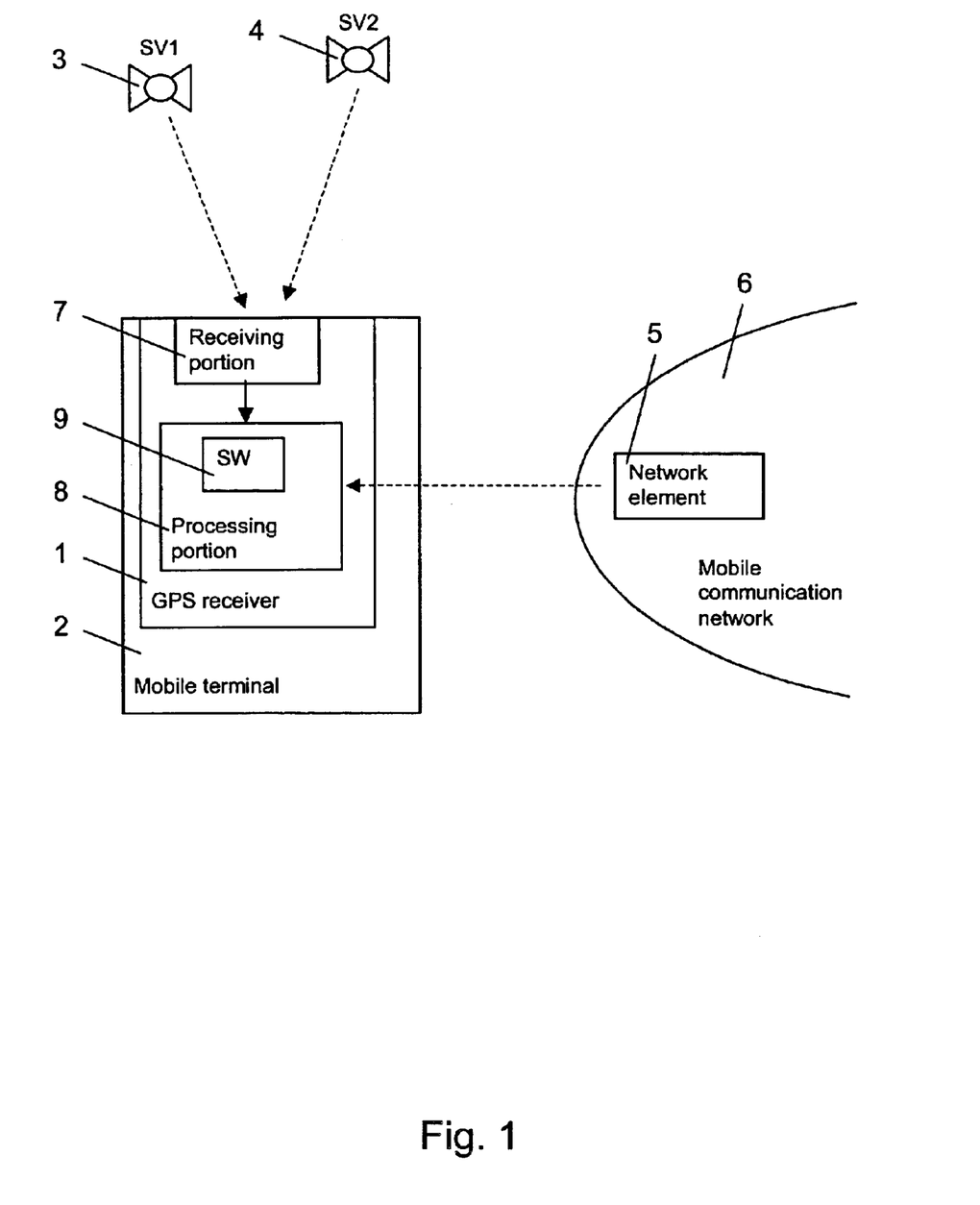
FIG. 1 schematically shows a positioning system in which an embodiment of the invention can be implemented.

FIG. 1 schematically presents by way of example a GPS positioning system, in which the position of a GPS receiver 1 can be determined in accordance with the invention.

The positioning system comprises a mobile terminal 2 with the GPS receiver 1, a plurality of GPS satellites, of which two are shown as $SV_1$ 3 and $SV_2$ 4, and a network element 5 of a mobile communication network 6.

The GPS receiver 1 includes a receiving portion 7 and a processing portion 8. The receiving portion 7 receives, acquires and tracks code modulated signals transmitted by the GPS satellites 3, 4. Further, it performs measurements on the signals and extracts information included in the signals. The processing portion 8 uses a software 9 for estimating the position of the GPS receiver 1 based on information received from the receiving portion 7. For estimating the receiver position, the processing portion 8 first determines a region which can be assumed to comprise the receiver positions and then estimates the true receiver position by minimizing an error criterion.

The mobile terminal 1 is able to communicate with the mobile communication network 6 in a known manner. Thereby, it is able to provide information made available by the network element 5 of the mobile communication network 6 to the processing portion 8 of the GPS receiver 1. Such information may include for example information on the accurate GPS time, information on a reference location or information on the altitude in the radio cell in which the mobile terminal 1 is currently located.

Figure 2:
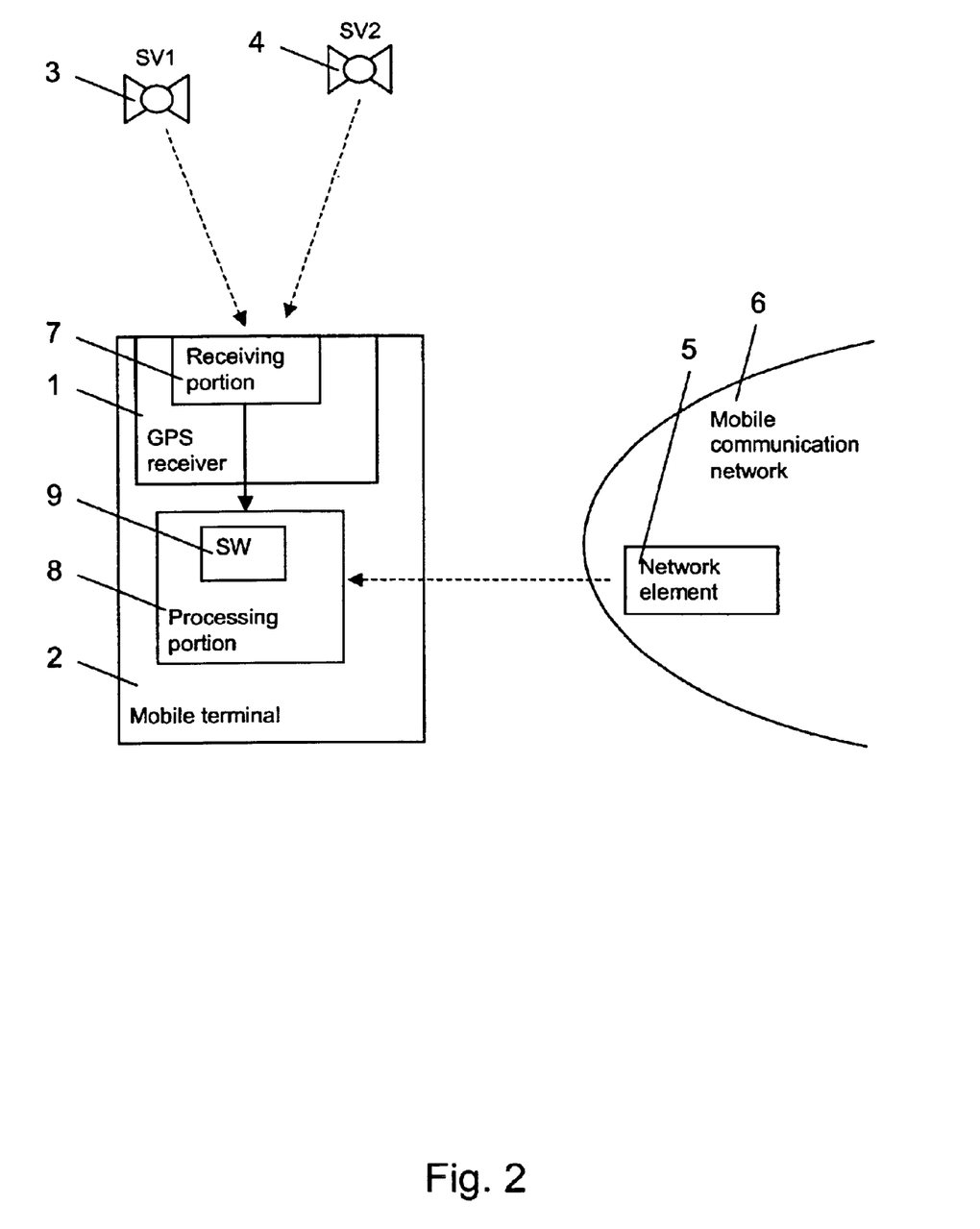
FIG. 2 schematically shows an alternative positioning system in which an embodiment of the invention can be implemented.

FIG. 2 schematically presents by way of example an alternative GPS positioning system, in which the position of a GPS receiver 1 can be estimated in accordance with the invention.

The system corresponds mainly to the system of FIG. 1, and the same reference signs 1 to 9 were employed for corresponding components. In this case, however, the processing portion 8 using a software 9 for determining the position of the GPS receiver 1 is integrated within the mobile terminal 2, but outside of the GPS receiver 1. The receiving portion 7 of the GPS receiver 1 is nevertheless able to provide information on received GPS signals to the processing portion 8.

Figure 3:
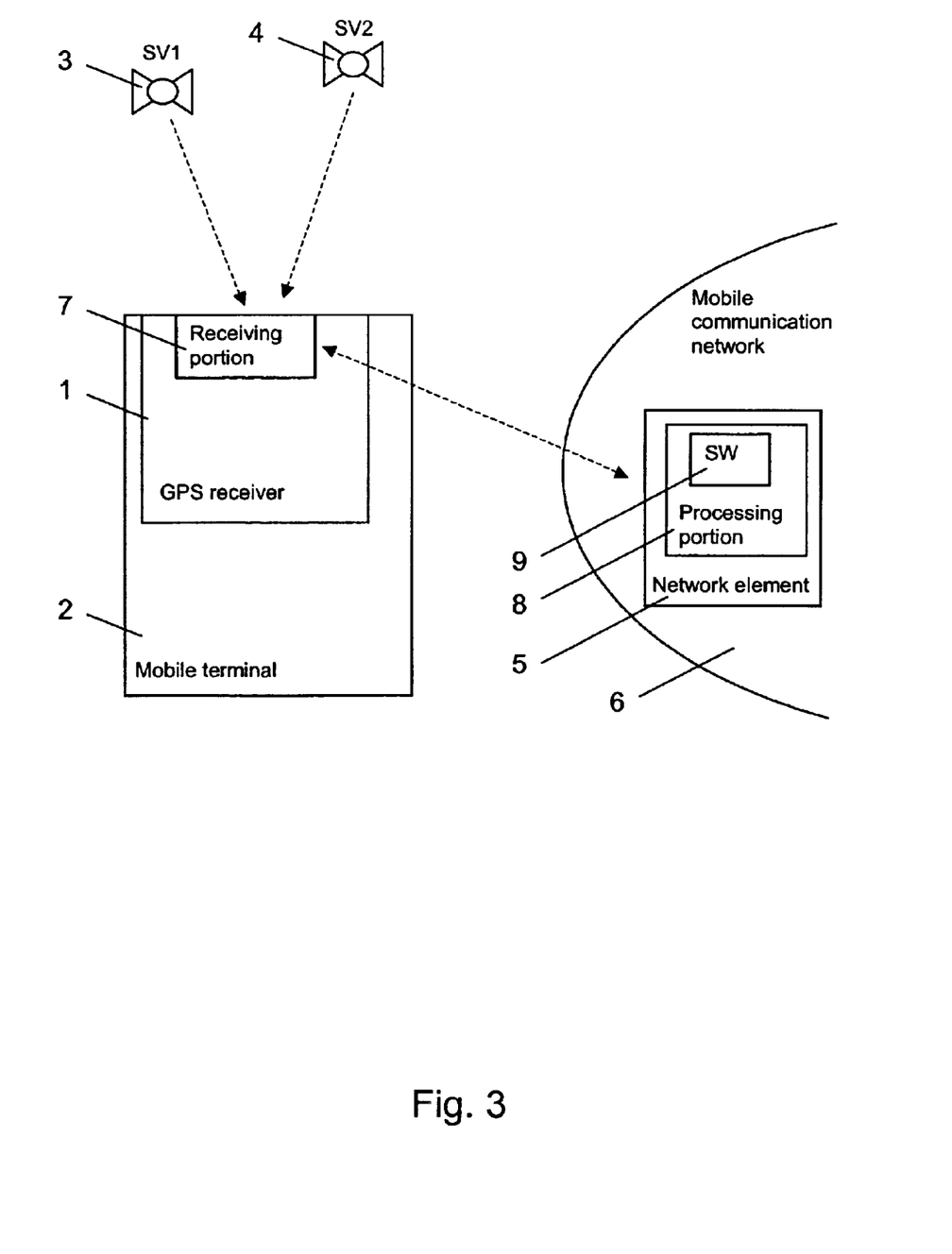
FIG. 3 schematically shows a further alternative positioning system in which an embodiment of the invention can be implemented.

FIG. 3 schematically presents by way of example a further alternative GPS positioning system, in which the position of a GPS receiver 1 can be estimated in accordance with the invention.

The system corresponds mainly again to the system of FIG. 1, and the same reference signs 1 to 9 were employed again for corresponding components. In this case, however, the processing portion 8 using a software 9 for determining the position of the GPS receiver 1 is integrated in the network element 5 of the mobile communication network 6 and thus even outside of the mobile terminal 2. The receiving portion 7 of the GPS receiver 1 is able to provide information on received GPS signals to the processing portion 8 of the network element 5 making use of the communication abilities of the mobile terminal 2.

FIGS. 4 to 7 illustrate different situations, in which the position of the GPS receiver 1 can be estimated in any of the systems of FIGS. 1 to 3 in accordance with the invention.

For a first type of situations, it is assumed that the time of the GPS receiver 1 is the accurate time of the GPS system. That is, the time of arrival of GPS satellite signals at the GPS receiver 1 can be determined accurately.

Figure 4:
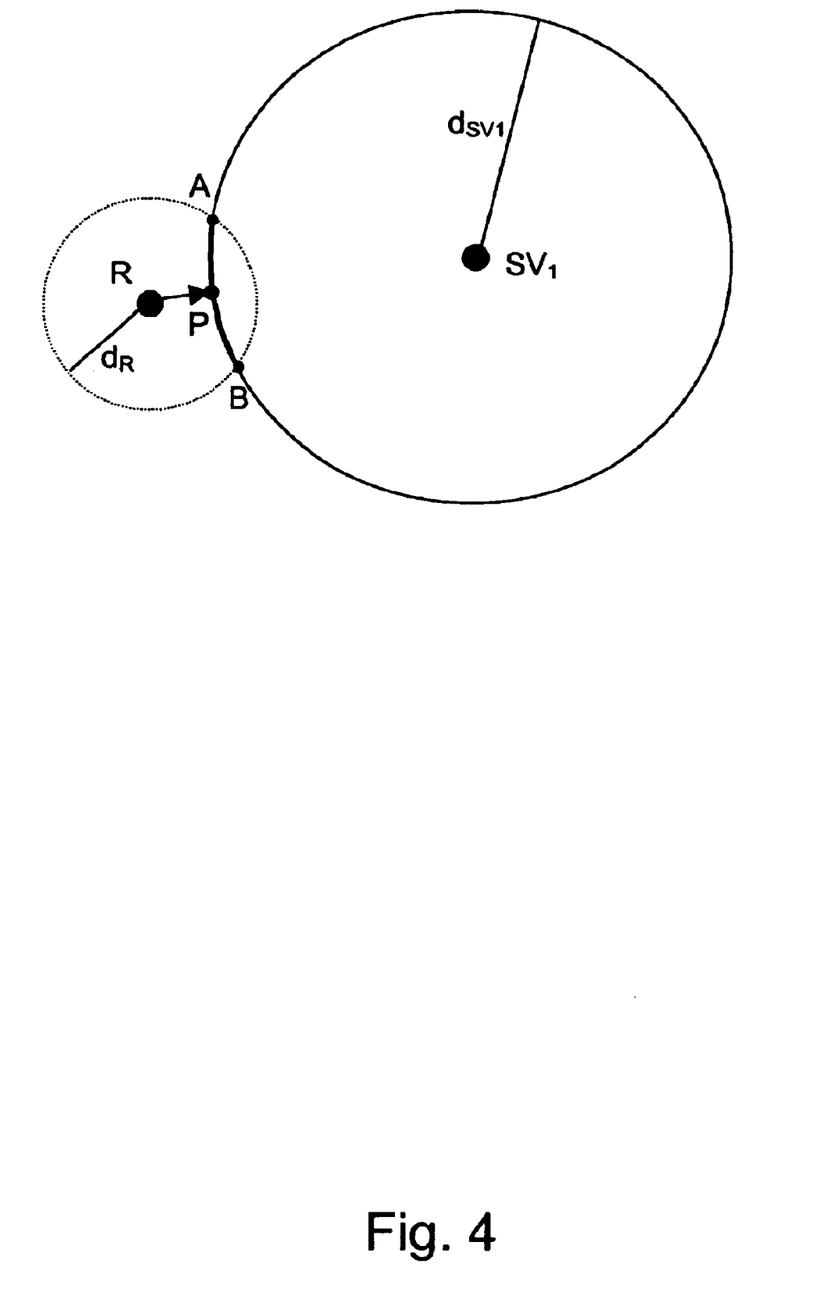
FIG. 4 illustrates a first situation in which an embodiment of the invention can be used.

A possible situation of this first type is illustrated in FIG. 4. In this situation, only signals from one GPS satellite $SV_1$ are received by the GPS receiver 1. In addition, a reference location R is known, for example in form of a previously fixed position of the GPS receiver 1. Alternatively, the reference location R may correspond to the coordinates of the radio cell in which the mobile terminal 2 is currently located. Such coordinates may be provided to the mobile terminal 2 by the mobile communication network 6.

In the situation of FIG. 4, the possible positions of the GPS receiver 1 are located on a first sphere having its center at the position of the satellite $SV_1$ and having a radius which is equal to the distance $d_{SV1}$ between the satellite $SV_1$ and the GPS receiver 1. The position of the satellite $SV_1$ is indicated to the receiver with the ephemeris data in the received satellite signal. The distance $d_{SV1}$ can be calculated accurately by the GPS receiver 1 in a known manner from the time of transmission and the time of arrival of a specific fragment of the satellite signal, i.e. based on the information included in a received fragment and on measurements on this received fragment.

A second sphere around the reference location R indicates the accuracy limits of the reference location R. These accuracy limits and thus the radius $d_R$ of the second sphere can be estimated in many situations by the GPS receiver 1.

The true position of the GPS receiver 1 thus has to be located more specifically on the section (AB) of the first sphere which is comprised in the second sphere.

The receiver position P is estimated according to the invention within this section (AB) by minimizing an error criterion, as will be explained further below with reference to FIG. 8.

Figure 5:
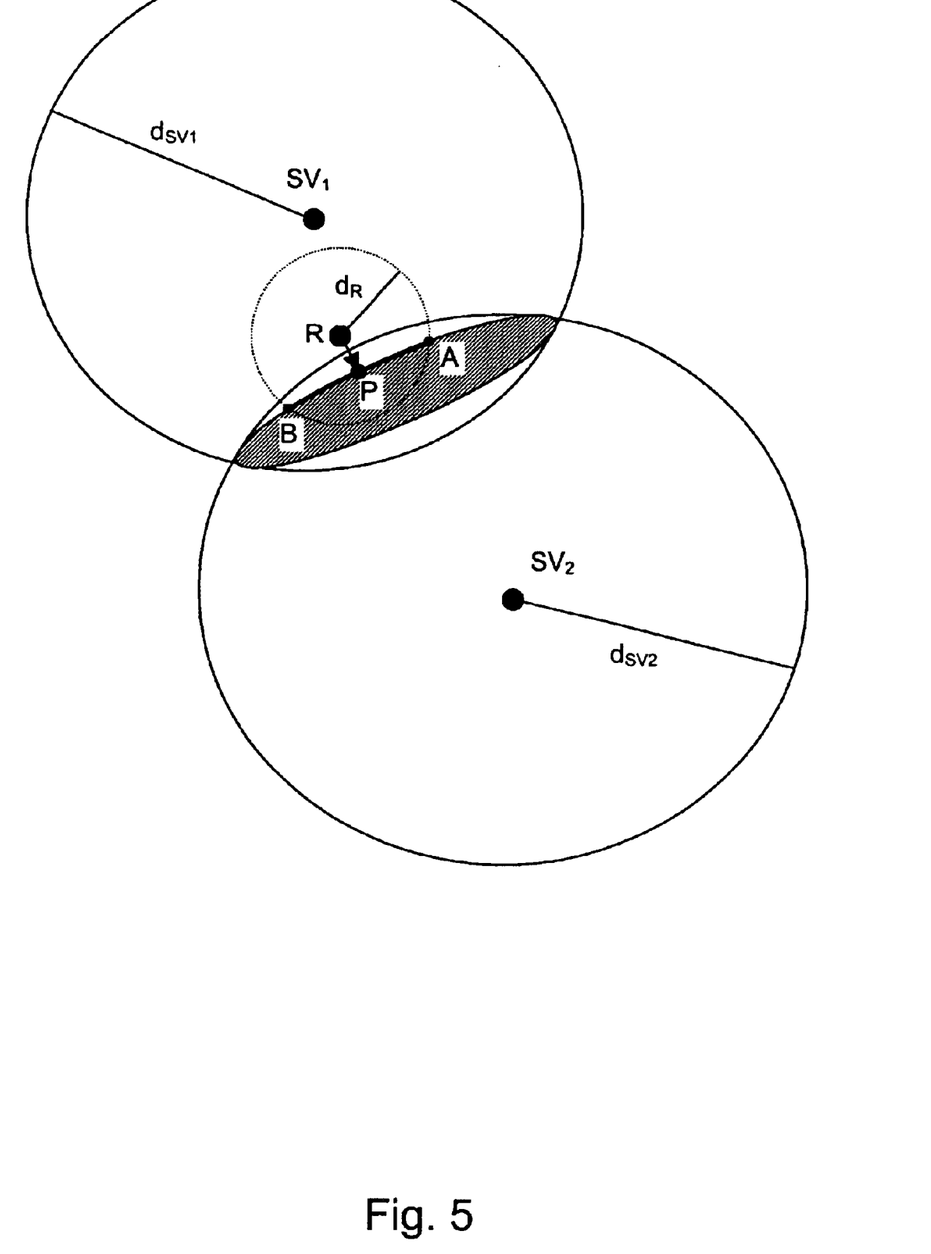
FIG. 5 illustrates a second situation in which an embodiment of the invention can be used.

Another possible situation of the first type is illustrated in FIG. 5. In this case, signals from two GPS satellites $Sv_1$, $SV_2$ are received by the GPS receiver 1. In addition, a reference location R is known again.

In this case, the possible positions of the GPS receiver 1 are known to be located on the circular line resulting from the intersection of two spheres centered at the location of respectively one of the two satellites $SV_1$, $SV_2$ and having radiuses $d_{SV1}$, $d_{SV2}$ defined by the distance between the GPS receiver 1 and the respective satellite $SV_1$, $SV_2$.

A third sphere around the reference location R having a radius $d_R$ indicates again the accuracy limits of the reference location R. The position of the GPS receiver 1 thus has to be located more specifically on the arc (AB) of the above mentioned circular line which is comprised in the third sphere.

The receiver position P is estimated according to the invention from positions on this arc (AB) by minimizing an error criterion, as will be explained further below with reference to FIG. 8.

For a second type of situation, it is assumed that the time of the GPS receiver 1 is not accurate, but that the limits of the accuracy of the time are known. That is, the time of arrival of GPS satellite signals at the GPS receiver 1 can be determined only with a limited but known accuracy.

The time inaccuracy has a linear shifting effect on the range measurements at the GPS receiver 1, as the distance between the GPS receiver 1 and a satellite is derived from a multiplication of the speed of light and the difference between the time of transmission and the time of arrival of a satellite signal.

Still, an area of possible positions of the GPS receiver 1 can be found by taking into account the accuracy of the time measurement. To each possible time assumption, a region of possible positions is associated, and the sum of these regions constitutes the area of all possible positions.

In a possible situation of the second type, a reference location of a known accuracy is available, and the GPS receiver 1 receives signals only from a single satellite. In this case, the true receiver position is located in a region corresponding to a globe centered at the reference location with a radius determined by the accuracy of the reference location.

Figure 6:
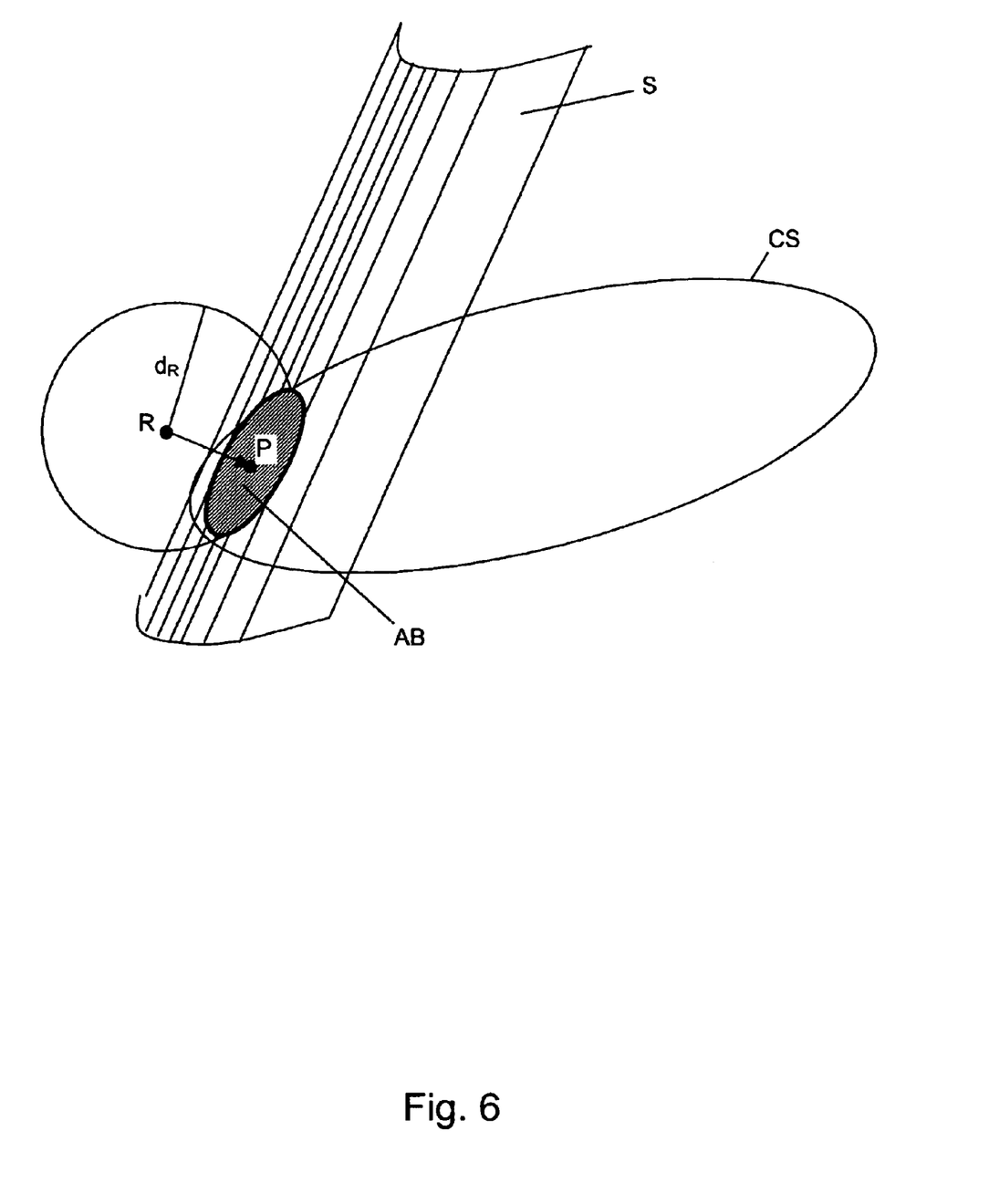
FIG. 6 illustrates a third situation in which an embodiment of the invention can be used.

In a further possible situation of the second type, which is illustrated in FIG. 6, a reference location R including its accuracy is known, and signals from two satellites are received at the GPS receiver 1. Proceeding from a specific, even though inaccurate, time of arrival of the signals of both satellites, two spheres can be obtained, which are centered at the location of one of the two satellites, respectively, and which have a radius calculated based on the time of transmission and the time of arrival of the signals from the corresponding satellite. As in the situation illustrated in FIG. 5, the intersection of the two spheres results in a circle line. If the assumed time of arrival is varied, then the radiuses of the spheres and thus the circle line vary as well.

When combining the circle lines resulting with all possible time assumptions for the time of arrival of the satellite signals, a surface S is obtained, which has to comprise the correct receiver position. In FIG. 6, a part of a hose-shaped surface S having a cross section CS is depicted. The final region of possible positions is then the portion AB of this surface S lying within a globe centered at the reference location R and having a radius $d_R$ according to its accuracy.

The receiver position P is estimated according to the invention from positions in this region AB by minimizing an error criterion, as will be explained further below with reference to FIG. 8.

Figure 7:
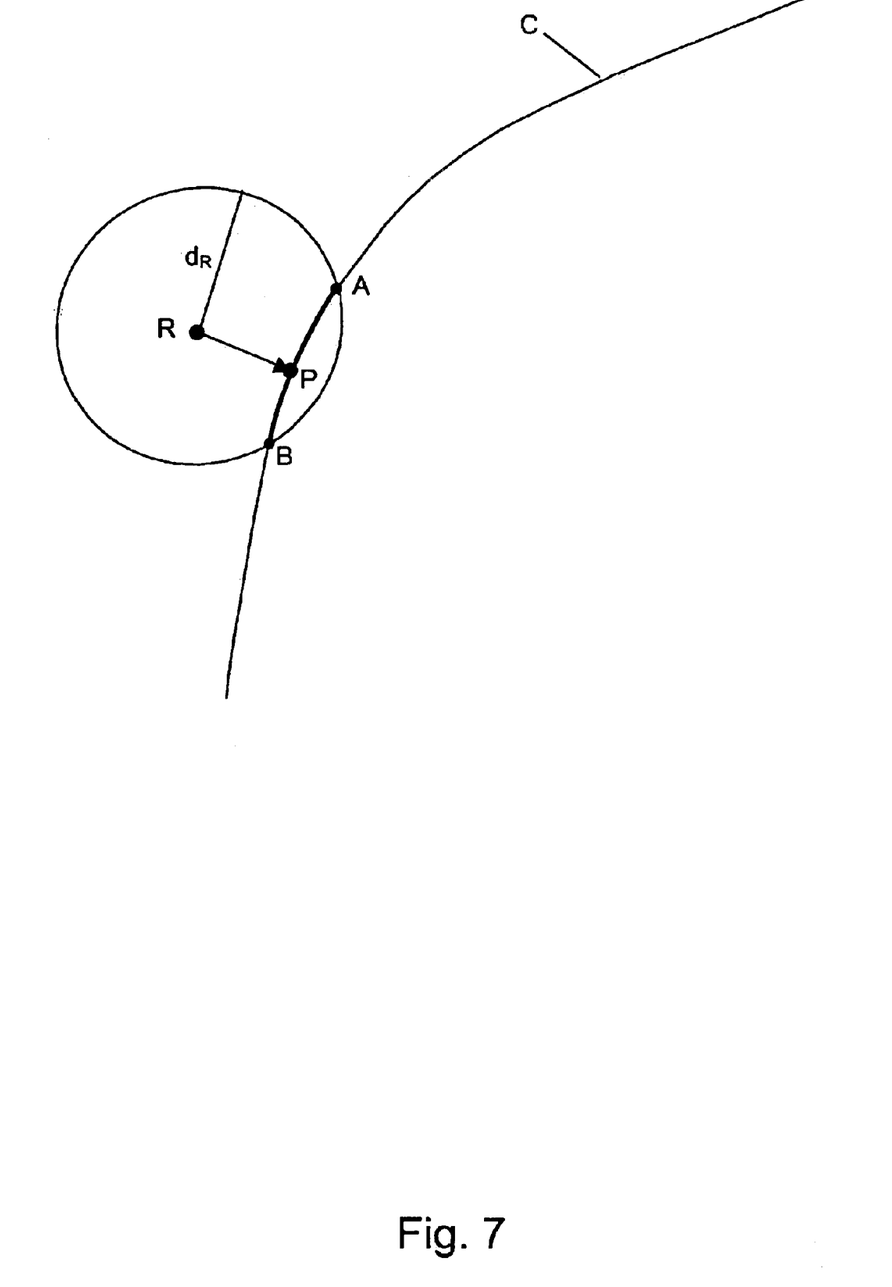
FIG. 7 illustrates a fourth situation in which an embodiment of the invention can be used.

In a further possible situation of the second type, which is illustrated in FIG. 7, a reference location R including its accuracy is known, and signals from three satellites are received at the GPS receiver 1.

If the number of satellites is three, then there is one possible position defined in the three-dimensional space for each time assumption. Combining these possible positions for all possible time assumptions leads to a curve C on which the receiver position has to be located. The section (AB) of this curve lying within the globe centered at the reference location R and having a radius $d_R$ according to its accuracy constitutes the region of possible positions.

The receiver position P is estimated according to the invention from positions in this section (AB) by minimizing an error criterion, as will be explained now with reference to FIG. 8.

Figure 8:
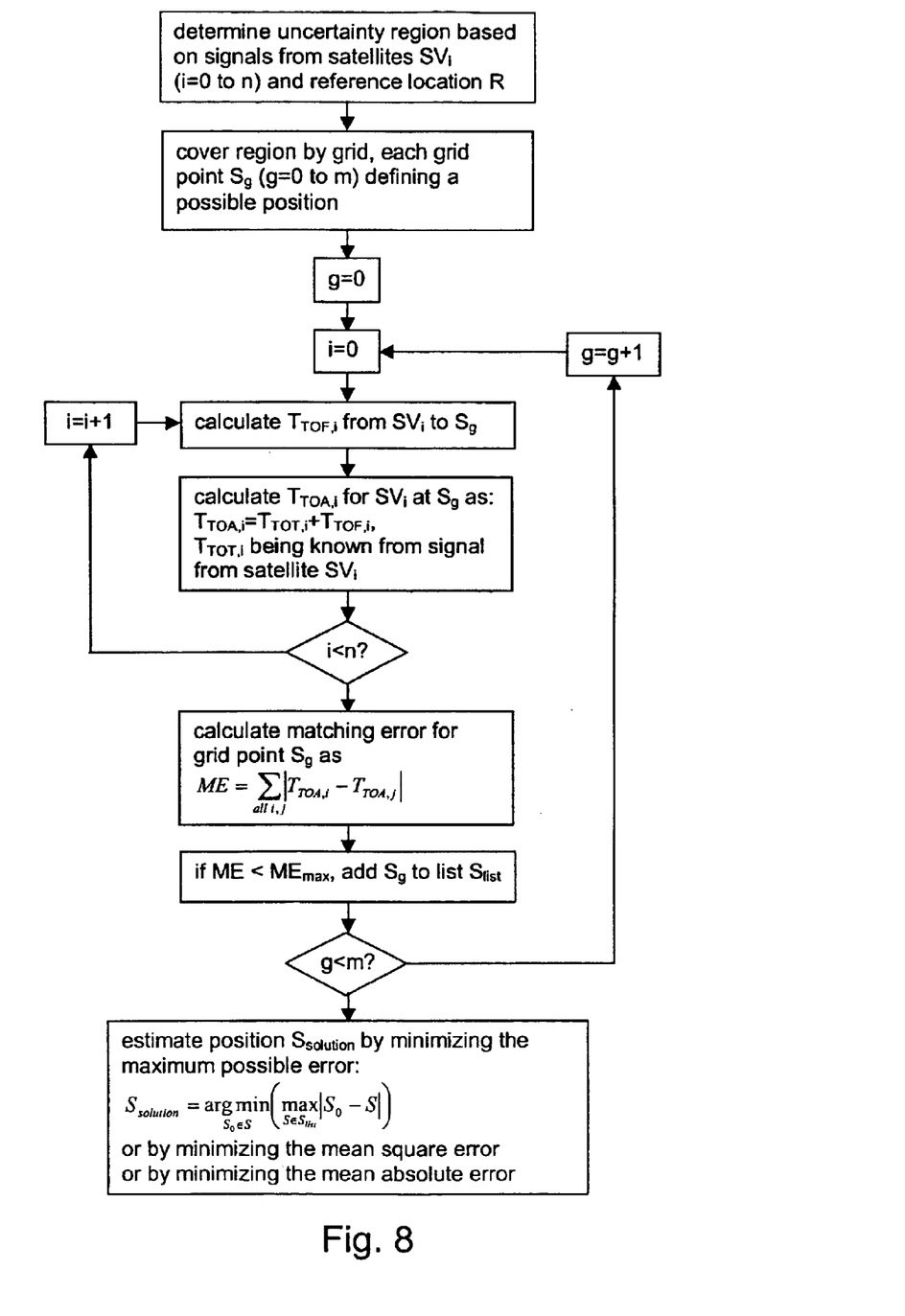
FIG. 8 is a flow chart illustrating an embodiment of the method according to the invention implemented in the system of one of FIGS. 1 to 3.

FIG. 8 is a flow chart illustrating the estimation of the GPS receiver 1 in the processing portion 8 of any of the systems of FIGS. 1 to 3.

In a first step, the processing portion 8 determines an uncertainty region. The uncertainty region is the region in which the GPS receiver 1 has to be located according to available information. The uncertainty region is determined more specifically based on available information about a reference location R and on information received from the receiving portion 7 about the signals from at least one satellite $SV_1$, $SV_2$, as described above for the situations illustrated in FIGS. 4 to 7.

The uncertainty region is then covered by a grid. Each of the grid points $S_g$, with g=1 to m, is considered as another possibility for the receiver position. m is the number of grid points in the grid. The coarseness of the grid is defined by the required accuracy of the final solution.

For each grid point $S_g$, the distance to all available satellites or to the strongest satellites $SV_i$, with i=1 to n, is determined. n is the total number of the considered satellites, equal to at least two in this embodiment of the invention. Based on the determined distance, the time of flight $T_{TOF,i}$ of signals propagating from a respective satellite $SV_i$ to the position of the respective grid point $S_g$ is calculated for each of the satellites $SV_i$. The time of transmission $T_{TOT,i}$ of the signals received at the GPS receiver 1 from all considered satellites $SV_i$ is known from measurements in the receiving portion 7 of the GPS receiver 1. The time of arrival $T_{TOA,i}$ of the signals from each of the satellites $SV_i$ at the location of the respective grid point $S_g$ is estimated according to the following equation:

$$T_{TOA,i} = T_{TOT,i} + T_{TOF,i}.$$

For each grid point $S_g$, the matching of the reception time is estimated from all determined times of arrival by estimating the matching error ME according to the following equation:

$$ME = \sum_{\substack{all\ i,j \\ i<j}} |T_{TOA,i} - T_{TOA,j}|$$

For the matching error ME, an acceptable threshold value $ME_{max}$ is predefined. If the determined value ME is smaller than the threshold value $ME_{max}$ for a particular grid point $S_g$, and if the position of the grid point $S_g$ satisfies all other possible conditions, then this grid point $S_g$ is included in a list of all possible solutions $S_{list}$. The mentioned other possible conditions may be for example a knowledge about the altitude, etc. If such additional information is considered, the position estimate will be more accurate.

When all grid points $S_g$ have been evaluated and either been added to the list $S_{list}$ or been discarded, the receiver position $S_{solution}$ is estimated by selecting one of the grid points from the list $S_{list}$ as receiver position. When a grid point $S_0$ is selected from the list $S_{list}$ as estimate for the receiver position, the maximum error corresponds to the distance between the selected grid point $S_0$ and the grid point in the list $S_{list}$ having the largest distance to the selected grid point $S_0$. The receiver position $S_{solution}$ can thus be estimated for example by finding the minimum of the maximum error according to the following equation:

$$S_{solution} = \underset{S_0 \in S}{\operatorname{argmin}} \left( \underset{S \in S_{list}}{\max} |S_0 - S| \right)$$

It has to be noted that the solution could also be search outside of the list of possible solutions $S_{list}$.

In general, the receiver position $S_{solution}$ can be estimated among all positions s considered to be possible according to the following equation:

$$S_{solution} = \underset{s_0}{\operatorname{argmin}} \left( \underset{all\ possible\ s}{\max} |s_0 - s| \right)$$

In some cases, a probability density function p will be known, which associates to each possible position s a probability density p(s). In this case, the error criterion advantageously considers as well this probability density function. This can be realized for example by minimizing the mean square error according to the following equation:

$$S_{solution} = \underset{s_0}{\operatorname{argmin}} \int_{all\ possible\ s} (s_0 - s)^2 p(s) ds$$

or the mean absolute error according to the following equation:

$$S_{solution} = \underset{s_0}{\operatorname{argmin}} \int_{all\ possible\ s} |s_0 - s| p(s) ds$$

It is to be understood that other known mathematical methods for minimizing an error criterion can be used as well for estimating the position of the GPS receiver 1.

If the maximum possible error is minimized in the situation of FIG. 4 without consideration of any other possible conditions, then the estimated receiver position P will be the projection of the reference location R onto the sector of the first sphere bounded by (AB).

If the maximum possible error is minimized in the situation of FIG. 5 without consideration of any other possible conditions, then the estimated receiver position P will be the projection of the reference location R onto the arc bounded by (AB).

If the maximum possible error is minimized in the situation of an inaccurate time and a single satellite without consideration of any other possible conditions, the estimated receiver position is the position of the reference location. The accurate time can then be calculated from the range between the reference location and the satellite position.

The estimated receiver position P resulting in the situation of FIG. 6 based on the minimum of the maximum possible error without consideration of any other possible conditions is indicated in FIG. 6 in the portion AB of the surface S.

The estimated receiver position P resulting in the situation of FIG. 7 based on the minimum of the maximum possible error without consideration of any other possible conditions, is indicated in FIG. 7 in the section bounded by (AB) of the curve C.

On the whole, it becomes apparent that the invention provides a possibility of estimating a receiver position with a good reliability even when only signals from a limited number of GPS satellites are available.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for estimating the position of a receiver receiving code modulated signals from at least one beacon, said method comprising:
    delimiting a region containing said receiver position based on a code modulated signal received at said receiver from at least one beacon and on available information including at least an initial information on said receiver position; and
    estimating said receiver position as a position within said delimited region which minimizes an error criterion,
    wherein said error criterion is at least one of a mean square error of a position within said delimited region, a mean absolute error of a position within said delimited region and a maximum error of a position within said delimited region.

2. The method according to claim 1, wherein said error criterion takes into account a probability density function indicating the probability density for positions in said delimited region to correspond to said receiver position.

3. The method according to claim 1, wherein estimating said receiver position comprises covering said delimited region with a grid comprising a plurality of grid points, and determining the receiver position as one of said grid points which minimizes among at least selected ones of said grid points said error criterion.

4. The method according to claim 3, further comprising:
    calculating an assumed time of arrival of code modulated signals from at least two beacons at each of said grid points based on the time of transmission of said code modulated signals and the time of flight of said code modulated signals to said grid points;
    comparing the differences between said calculated times of arrival with a threshold value; and
    excluding those grid points for which said differences exceed said threshold value before determining said grid point which minimizes among remaining grid points said error criterion.

5. The method according to claim 3, further comprising excluding certain grid points based on known conditions before determining said grid point which minimizes among remaining grid points said error criterion.

6. The method according to claim 1, comprising, in case a time available at said receiver is not accurate but a maximum deviation of said available time from an accurate time is known, determining sub-regions based on a code modulated signal received from at least one beacon of said available time for different possible times within said maximum deviation, and delimiting said region containing said receiver position based on a combination of said sub-regions and on available information including at least an initial information on said receiver position.

7. A receiver comprising for an estimation of the position of said receiver:
    a receiving portion for receiving a code modulated signal from beacons; and
    a processing portion for delimiting a region containing said receiver position based on a code modulated signal received by said receiving portion from at least one beacon and on available information including at least an initial information on said receiver position, and for estimating said receiver position as a position within said delimited region which minimizes an error criterion,
    wherein said error criterion is at least one of a mean square error of a position within said delimited region, a mean absolute error of a position within said delimited region and a maximum error of a position within said delimited region.

8. A system for estimating the position of a receiver receiving code modulated signals from at least one beacon, said system comprising:
    said receiver, which includes a receiving portion for receiving code modulated signals from beacons; and
    a device with a processing portion for delimiting a region containing said receiver position based on a code modulated signal received by said receiving portion from at least one beacon and on available information including at least an initial information on said receiver position, and for estimating said receiver position as a position within said delimited region which minimizes an error criterion,
    wherein said error criterion is at least one of a mean square error of a position within said delimited region, a mean absolute error of a position within said delimited region and a maximum error of a position within said delimited region.

9. The system according to claim 8, wherein said device is combined with said receiver.

10. The system according to claim 9, further comprising a mobile communication network, wherein said device is a mobile terminal adapted to communicate with said mobile communication network.

11. The system according to claim 8, wherein said receiver is combined with a mobile terminal and wherein said device is a network element of a mobile communication network, said mobile terminal being adapted to communicate with said mobile communication network.

12. A software program product in which a software code for estimating the position of a receiver receiving code modulated signals from at least one beacon is stored, said software code realizing the following steps when running in a processing unit:

delimiting a region containing said receiver position based on a code modulated signal received at said receiver from at least one beacon and on available information including at least an initial information on said receiver position; and estimating said receiver position as a position within said delimited region which minimizes an error criterion, wherein said error criterion is at least one of a mean square error of a position within said delimited region, a mean absolute error of a position within said delimited region and a maximum error of a position within said delimited region.

* * * * *